United States Patent
Nakayama (10) Patent No.: US 12,511,001 B2
(45) Date of Patent: Dec. 30, 2025

(54) TOUCH SENSOR

(71) Applicant: FUJIFILM Corporation, Tokyo (JP)

(72) Inventor: Aya Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/886,459

(22) Filed: Sep. 16, 2024

(65) Prior Publication Data

US 2025/0103171 A1    Mar. 27, 2025

(30) Foreign Application Priority Data

Sep. 21, 2023    (JP) .................................. 2023-155464

(51) Int. Cl.
*G06F 3/044* (2006.01)
*G06F 3/041* (2006.01)

(52) U.S. Cl.
CPC ........ *G06F 3/0446* (2019.05); *G06F 3/04164* (2019.05); *G06F 2203/04112* (2013.01)

(58) Field of Classification Search
CPC ............... G06F 3/0446; G06F 3/04164; G06F 2203/04112; G06F 2203/04103; G06F 3/0445
See application file for complete search history.

(56) References Cited

U.S. PATENT DOCUMENTS

| | | | |
|---|---|---|---|
| 9,204,536 B2 | 12/2015 | Yoshiki | |
| 9,552,120 B2 * | 1/2017 | Bae | G06F 3/04164 |
| 9,626,052 B2 * | 4/2017 | Lu | G06F 3/0445 |
| 2013/0069898 A1 * | 3/2013 | Park | G06F 3/041 345/173 |
| 2015/0075843 A1 * | 3/2015 | Yamaguchi | H05K 1/0298 174/251 |
| 2015/0075846 A1 | 3/2015 | Yoshiki | |
| 2016/0085346 A1 * | 3/2016 | Tsukamoto | G06F 3/047 345/174 |
| 2019/0204963 A1 * | 7/2019 | Liu | G06F 3/044 |
| 2022/0075463 A1 * | 3/2022 | Tsai | G06F 3/04164 |
| 2023/0376159 A1 * | 11/2023 | Zhang | G06F 3/0443 |

FOREIGN PATENT DOCUMENTS

JP    5876351 B2    3/2016

* cited by examiner

*Primary Examiner* — Amy Onyekaba
(74) *Attorney, Agent, or Firm* — Edwards Neils LLC; Jean C. Edwards, Esq.

(57) ABSTRACT

A touch sensor capable of preventing a failure of a peripheral wiring due to peeling of a metal plating layer. The touch sensor includes a substrate and a conductive layer formed on the substrate, in which the conductive layer has a touch detection electrode, a first electrode pad formed at the touch detection electrode, a peripheral wiring drawn out from the first electrode pad, and a second electrode pad connected to the peripheral wiring. The touch detection electrode, the first electrode pad, the peripheral wiring, and the second electrode pad have a layer to be plated and a metal plating layer covering the layer to be plated. The peripheral wiring includes two or more layers to be plated spaced from each other in a width direction of the peripheral wiring at at least one location.

11 Claims, 8 Drawing Sheets

TOUCH SENSOR

CROSS-REFERENCE TO RELATED APPLICATIONS

The present application claims priority under 35 U.S.C. § 119 to Japanese Patent Application No. 2023-155464, filed on Sep. 21, 2023. The above application is hereby expressly incorporated by reference, in its entirety, into the present application.

BACKGROUND OF THE INVENTION

1. Field of the Invention

The present invention relates to a touch sensor that detects a touch operation.

2. Description of the Related Art

In the related art, in various electronic apparatuses including portable information apparatuses such as a tablet-type computer and a smartphone, a touch sensor that detects a so-called touch operation of allowing a finger, a stylus pen, or the like to contact or approach a screen has been used.

Such a touch sensor has a mesh-like touch detection electrode formed of a plurality of fine metal wires, a peripheral wiring drawn out from the touch detection electrode, and an electrode pad connected to the peripheral wiring in many cases, for example, as disclosed in JP5876351B. In JP5876351B, the touch detection electrode, the peripheral wiring, and the electrode pad are formed by using a so-called plating method.

SUMMARY OF THE INVENTION

As disclosed in JP5876351B, in a case where a touch detection electrode, a peripheral wiring, and an electrode pad are formed by a plating method, for example, a layer to be plated having a pattern corresponding to the touch detection electrode, the peripheral wiring, and the electrode pad is formed on a substrate, and then the substrate is immersed in a plating liquid, so that a metal plating layer covering the layer to be plated is formed in many cases. In a case where the peripheral wiring is formed by a plating method in this way, adhesiveness between the layer to be plated and the metal plating layer may be reduced due to stress of the metal plating layer, so that a failure in which the metal plating layer is peeled off may occur.

The present invention has been made to solve such a problem, and an object thereof is to provide a touch sensor capable of preventing a failure of a peripheral wiring due to peeling of a metal plating layer.

According to the following configuration, the object can be accomplished.

[1] A touch sensor comprising:
a substrate; and
a conductive layer formed on the substrate,
in which the conductive layer has
a plurality of mesh-like touch detection electrodes formed of a plurality of fine metal wires,
a plurality of first electrode pads formed at at least one end of the plurality of touch detection electrodes,
a plurality of peripheral wirings drawn out from the plurality of first electrode pads, and
a plurality of second electrode pads electrically connected to the plurality of peripheral wirings,
the plurality of touch detection electrodes, the plurality of first electrode pads, the plurality of peripheral wirings, and the plurality of second electrode pads have a layer to be plated and a metal plating layer covering the layer to be plated, and
each of the plurality of peripheral wirings includes two or more layers to be plated spaced from each other in a width direction of the peripheral wiring at at least one location.

[2] The touch sensor according to [1],
in which each of the plurality of peripheral wirings includes two or more layers to be plated connecting the first electrode pad and the second electrode pad.

[3] The touch sensor according to [1] or [2],
in which in a case where a line width of the plurality of peripheral wirings is denoted by W1 and a width of the layer to be plated in the plurality of peripheral wirings is denoted by A,
W1/A>2 is satisfied.

[4] The touch sensor according to any one of [1] to [3],
in which a line width W2 of the plurality of fine metal wires of the plurality of touch detection electrodes is 1.0 to 5.0 μm.

[5] The touch sensor according to any one of [1] to [4],
in which a ratio SM/ST of an area SM occupied by the metal plating layer of each of the plurality of peripheral wirings in a plan view, to an area ST of a portion surrounded by a contour of each of the plurality of peripheral wirings in the plan view satisfies
SM/ST≥0.9.

According to the present invention, a touch sensor includes a substrate and a conductive layer formed on the substrate, in which the conductive layer has a plurality of mesh-like touch detection electrodes formed of a plurality of fine metal wires, a plurality of first electrode pads formed at at least one end of the plurality of touch detection electrodes, a plurality of peripheral wirings drawn out from the plurality of first electrode pads, and a plurality of second electrode pads electrically connected to the plurality of peripheral wirings, the plurality of touch detection electrodes, the plurality of first electrode pads, the plurality of peripheral wirings, and the plurality of second electrode pads have a layer to be plated and a metal plating layer covering the layer to be plated, and each of the plurality of peripheral wirings includes two or more layers to be plated spaced from each other in a width direction of the peripheral wiring at at least one location, so that a failure of the peripheral wiring due to peeling of the metal plating layer can be prevented.

DESCRIPTION OF THE PREFERRED EMBODIMENTS

Hereinafter, a conductive member for a touch panel and a touch panel according to embodiments of the present invention will be described in detail, based on suitable embodiments shown in the accompanying drawings.

Furthermore, in the following, a notation using "to" between numbers indicating a numerical range is intended to include the numerical values described on both sides. For example, an expression that "s is a numerical value t1 to a numerical value t2" means that a range of s is a range including the numerical value t1 and the numerical value t2, and denotes $t1 \leq s \leq t2$ as expressed in mathematical symbols.

Unless otherwise specified, the meaning of an angle such as a term "perpendicular" or "parallel" includes a case where an error range is generally allowable in the technical field.

A term "transparent" indicates that a light transmittance in a visible wavelength range of 400 nm to 800 nm is at least 40% or more, preferably 75% or more, more preferably 80% or more, and still more preferably 90% or more. The light transmittance is measured by using "Plastics-Determination of Total Luminous Transmittance And Reflectance" defined by JIS K 7375:2008.

EMBODIMENTS

Figure 1:
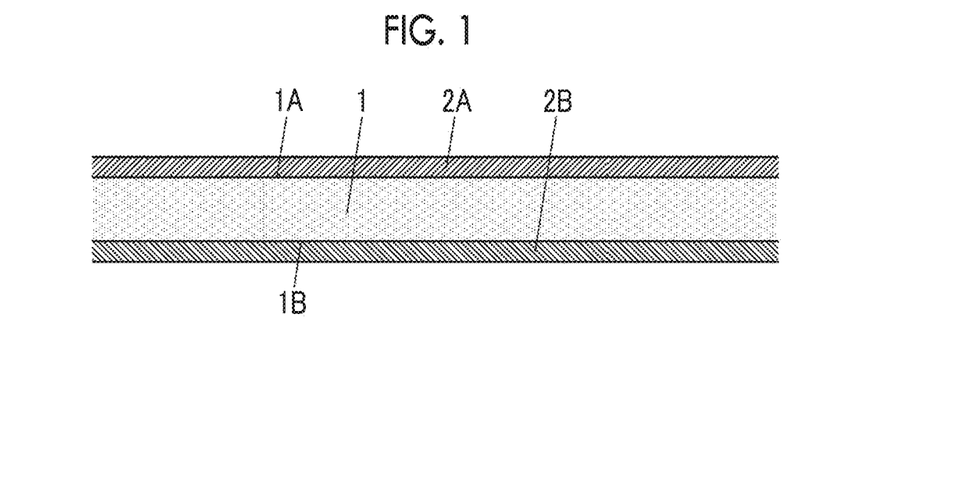
FIG. 1 is a partial cross-sectional view showing a touch sensor according to an embodiment.

FIG. 1 shows a configuration of a touch sensor according to an embodiment of the present invention.

The touch sensor comprises a substrate 1 having a first surface 1A and a second surface 1B forming the front and the back from each other, a first conductive layer 2A disposed on the first surface 1A of the substrate 1, and a second conductive layer 2B disposed on the second surface 1B of the substrate 1. The substrate 1 has insulating properties, and the first conductive layer 2A and the second conductive layer 2B are electrically insulated from each other. In addition, the substrate 1 has flexibility, and the touch sensor has flexibility conforming to the flexibility of the substrate 1. In addition, the substrate 1 is composed of a transparent material.

The touch sensor has a cover member not shown that adheres to a surface on the first conductive layer 2A side, and a display module not shown that adheres to a surface on the second conductive layer 2B side, and as a result, the touch sensor may be used as a touch panel display device not shown. In this case, a finger, a stylus pen, or the like of a user that contacts or approaches the cover member is detected, and a touch operation by the user is detected.

Figure 2:
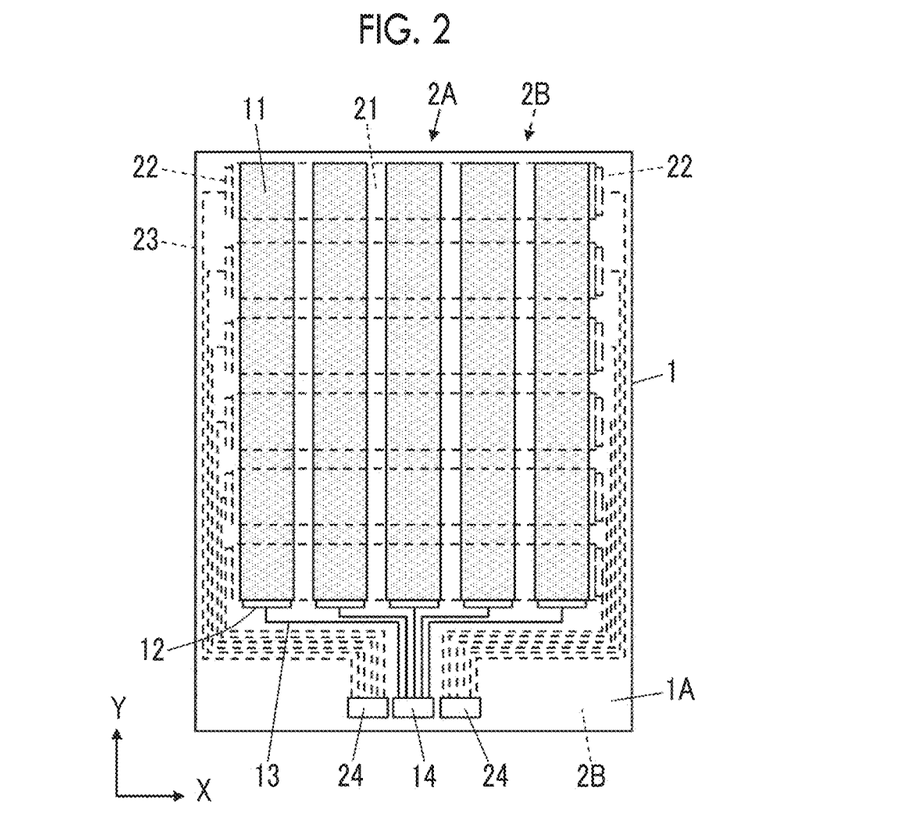
FIG. 2 is a plan view of the touch sensor according to the embodiment.

FIG. 2 is a plan view showing the touch sensor.

The first conductive layer 2A has a plurality of touch detection electrodes 11 for detecting a touch operation, which extend along a determined Y direction and are arranged along an X direction perpendicular to the Y direction, a plurality of first electrode pads 12 formed at one end of the plurality of touch detection electrodes 11, a plurality of peripheral wirings 13 drawn out from the plurality of first electrode pads 12, and a plurality of second electrode pads 14 connected to the plurality of peripheral wirings 13. The plurality of second electrode pads 14 are used to be electrically connected to an external device not shown.

The second conductive layer 2B includes a plurality of touch detection electrodes 21 for detecting a touch operation, which extend along the X direction and are arranged in the Y direction, a plurality of first electrode pads 22 formed at both ends of the plurality of touch detection electrodes 21, a plurality of peripheral wirings 23 drawn out from the plurality of first electrode pads 22, and a plurality of second electrode pads 24 connected to the plurality of peripheral wirings 23. The plurality of second electrode pads 24 are used to be electrically connected to an external device not shown. While the plurality of first electrode pads 22 are formed at both ends of the plurality of touch detection electrodes 21, the plurality of first electrode pads 22 may be formed at only one end of the plurality of touch detection electrodes 21.

A region where the plurality of touch detection electrodes 11 of the first conductive layer 2A are disposed and a region where the plurality of touch detection electrodes 21 of the second conductive layer 2B are disposed to overlap each other, with the substrate 1 sandwiched therebetween in a Z direction perpendicular to both of the X direction and the Y direction.

Figure 3:
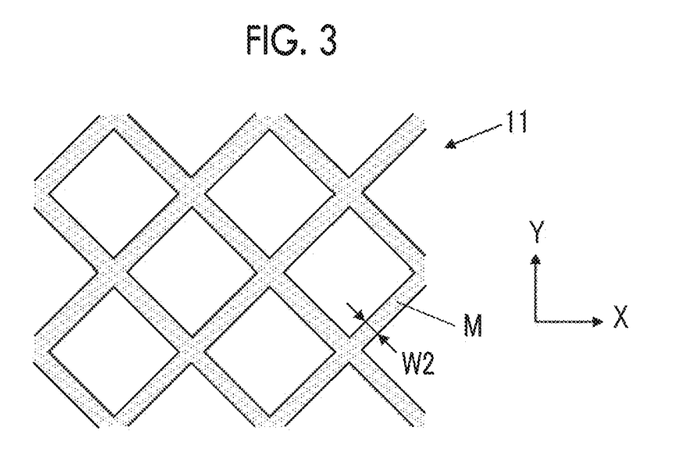
FIG. 3 is an enlarged plan view showing a part of a touch detection electrode according to the embodiment.

As shown in FIG. 3, the touch detection electrode 11 in the first conductive layer 2A is composed of a plurality of fine metal wires M forming a mesh shape. In order to suppress the occurrence of a so-called moire in a case where the touch detection electrode 11 disposed on a display module not shown is visually recognized by an observer, an average value of line widths W2 of the plurality of fine metal wires M is preferably in the range of 1.0 μm to 5.0 μm.

Figure 4:
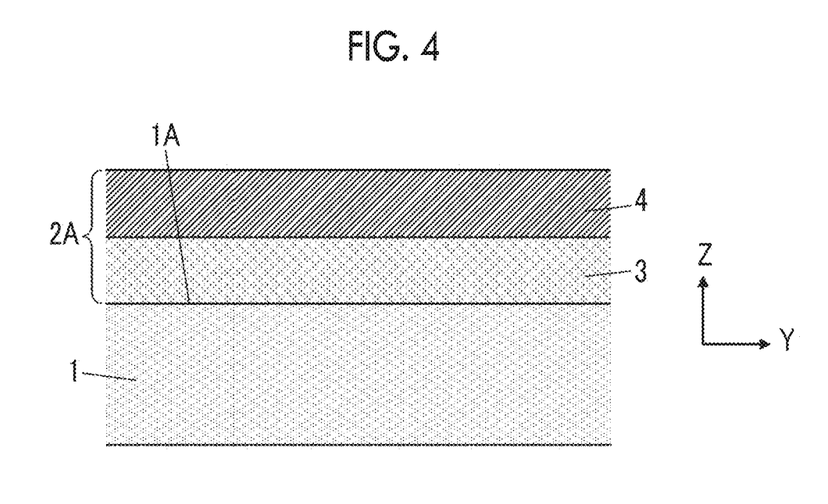
FIG. 4 is an enlarged cross-sectional view showing a part of a first conductive layer according to the embodiment.

The first conductive layer 2A is formed by a so-called plating method. As shown in FIG. 4, the first conductive layer 2A has a layer to be plated 3 that is formed on the first surface 1A of the substrate 1, and a metal plating layer 4 that is formed by plating the layer to be plated 3 and covers the layer to be plated 3. That is, each of the plurality of touch detection electrodes 11, the plurality of first electrode pads 12, the plurality of peripheral wirings 13, and the plurality of second electrode pads 14 has the layer to be plated 3 and the metal plating layer 4.

In a case where the layer to be plated 3 is subjected to a plating treatment, the substrate 1 on which the layer to be plated 3 has been formed is immersed in a plating liquid that includes metal ions to be precipitated and a reducing agent for reducing the metal ions to a metal. In this case, a thickness of the metal plating layer 4 is adjusted depending on the composition of the plating liquid, the plating temperature, the plating time, and the like.

Figure 5:
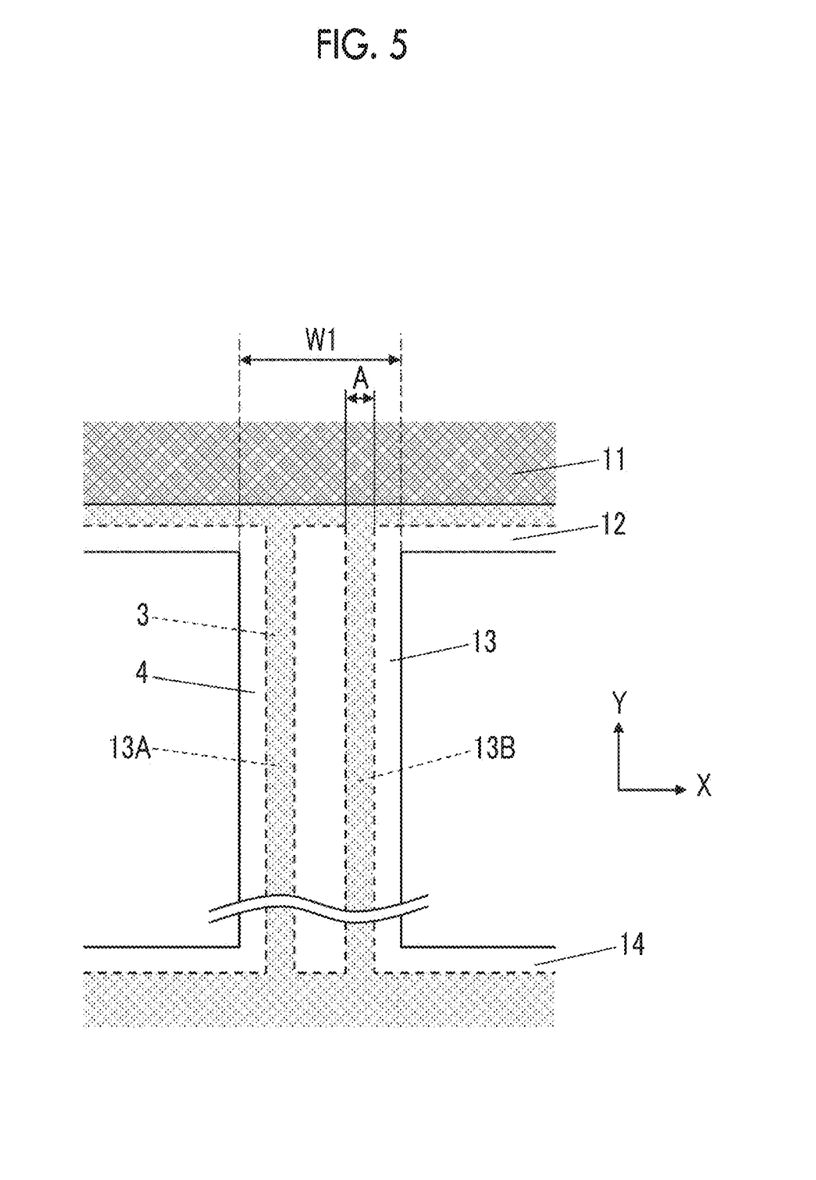
FIG. 5 is an enlarged plan view showing a peripheral wiring according to the embodiment.

As shown in FIG. 5, the peripheral wiring 13 has two layers to be plated 13A and 13B that are spaced from each other in a width direction of the peripheral wiring 13 and that connect the first electrode pad 12 and the second electrode pad 14. The metal plating layer 4 of the peripheral wiring 13 is formed to cover both of the two layers to be plated 13A and 13B. The peripheral wiring 13 has a line width W1. In addition, each of the layers to be plated 13A and 13B has a width A.

Here, the line width W1 of the peripheral wiring 13 is a dimension of the peripheral wiring 13 in a direction perpendicular to a direction in which the peripheral wiring 13 extends. In addition, the widths A of the layers to be plated 13A and 13B are dimensions of the layers to be plated 13A and 13B in a direction perpendicular to a direction in which the layers to be plated 13A and 13B extend. In the example of FIG. 5, the direction in which the peripheral wiring 13 extends and the direction in which the layers to be plated 13A and 13B extend match each other.

In FIG. 5, the layer to be plated 3 and the metal plating layer 4 of the touch detection electrode 11 are not shown for simplification of the description.

Figure 6:
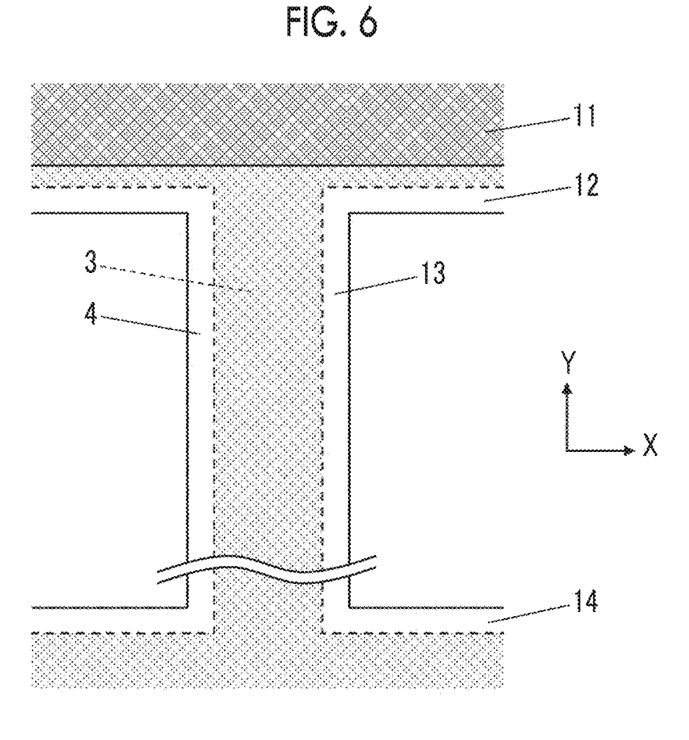
FIG. 6 is an enlarged plan view showing an example of a peripheral wiring in the related art.

Meanwhile, in general, in a case where the peripheral wiring 13 is formed by a plating method, for example, as shown in FIG. 6, one layer to be plated 3 corresponding to one peripheral wiring 13 is formed, and the metal plating layer 4 is formed to cover the layer to be plated 3 in many cases. In this case, due to stress of the metal plating layer 4, adhesiveness between the layer to be plated 3 and the metal plating layer 4 may be reduced, so that a failure may occur, in which the metal plating layer 4 is peeled off due to rubbing of the peripheral wiring 13 by another touch sensor or the like during the manufacturing or after the manufacturing of the peripheral wiring 13.

In the touch sensor according to the embodiment of the present invention, since the peripheral wiring 13 includes the two layers to be plated 13A and 13B, each of a contact area between the layer to be plated 13A and the metal plating layer 4 and a contact area between the layer to be plated 13B and the metal plating layer 4 is sufficiently small. Therefore, stress between the layer to be plated 13A and the metal plating layer 4 and stress between the layer to be plated 13B and the metal plating layer 4 are sufficiently small, and good adhesiveness between the layer to be plated 13A and the metal plating layer 4 and between the layer to be plated 13B and the metal plating layer 4 can be obtained, so that a failure due to peeling of the metal plating layer 4 can be prevented.

Here, it is preferable that the width W1 of the peripheral wiring 13 and the widths A of the layers to be plated 13A and 13B in the peripheral wiring 13 satisfy $W1/A>2$. By satisfying this inequality, stress of the metal plating layer 4 covering the layer to be plated 13A and stress of the metal plating layer 4 covering the layer to be plated 13B can be sufficiently suppressed, so that adhesiveness between the layers to be plated 13A and 13B, and the metal plating layer 4 can be improved.

Furthermore, although not shown, the touch detection electrode 21 in the second conductive layer 2B is also composed of the plurality of fine metal wires M forming a mesh shape as in the touch detection electrode 11 in the first conductive layer 2A. In order to suppress the occurrence of a so-called moire in a case where the touch detection electrode 21 disposed on a display module not shown is visually recognized by an observer, an average value of the line widths W1 of the plurality of fine metal wires M in the second conductive layer 2B is also preferably in the range of 1.0 μm to 5.0 μm.

Moreover, the second conductive layer 2B is also formed by a plating method as in the first conductive layer 2A, and has a layer to be plated and a metal plating layer. In addition, the layer to be plated and the metal plating layer in the second conductive layer 2B each have the same configurations as the layer to be plated 3 and the metal plating layer 4 in the first conductive layer 2A. Therefore, detailed descriptions thereof will not be repeated.

As described above, with the touch sensor according to the embodiment of the present invention, since each of the plurality of peripheral wirings 13 includes the two layers to be plated 13A and 13B spaced from each other in the width direction of the peripheral wiring 13, the adhesiveness between the layer to be plated 13A and the metal plating layer 4 and the adhesiveness between the layer to be plated 13B and the metal plating layer 4 can be improved, so that a failure of the peripheral wiring 13 in which the metal plating layer 4 is peeled off can be prevented.

It has been described that each of the plurality of peripheral wirings 13 includes the two layers to be plated 13A and 13B spaced from each other in the width direction of the peripheral wiring 13 in the entire portion thereof. However, as long as each of the plurality of peripheral wirings 13 includes two or more layers to be plated 3 spaced from each other in the width direction of the peripheral wiring 13 at at least one location, the failure of the peripheral wiring 13 in which the metal plating layer 4 is peeled off can be prevented.

However, it is preferable that each of the plurality of peripheral wirings 13 includes the two or more layers to be plated 3 spaced from each other in the width direction of the peripheral wiring 13 in the entire portion thereof from the viewpoint in which the failure of the peripheral wiring 13 is prevented.

Figure 10:
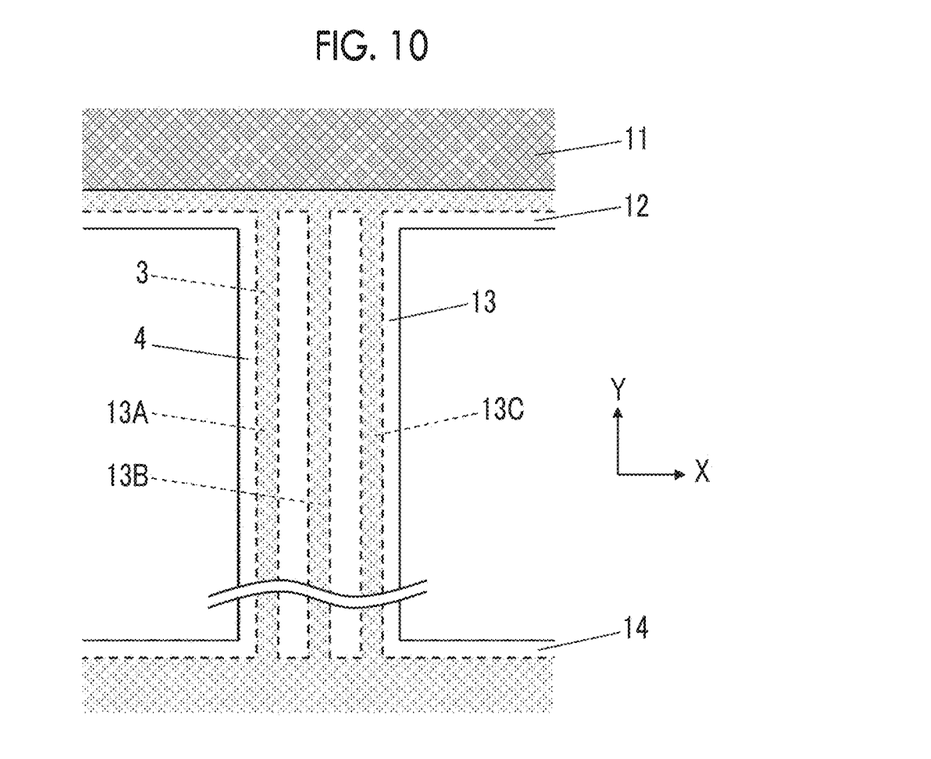
FIG. 10 is an enlarged plan view showing a peripheral wiring according to a first modification example of the embodiment.
Figure 11:
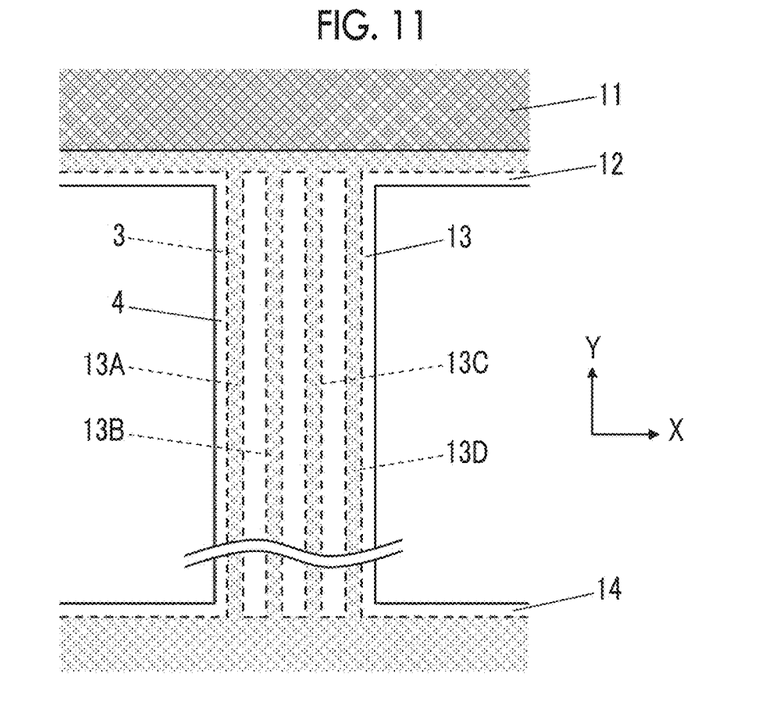
FIG. 11 is an enlarged plan view showing a peripheral wiring according to a second modification example of the embodiment.

FIGS. 10 and 11 show an example in which the peripheral wiring 13 includes three or more layers to be plated 3 in the width direction thereof. In the example of FIG. 10, the peripheral wiring 13 includes three layers to be plated 13A, 13B, and 13C in the width direction thereof. Each of the layers to be plated 13A, 13B, and 13C connects the first electrode pad 12 and the second electrode pad 14. The metal plating layer 4 is formed to cover the three layers to be plated 13A, 13B, and 13C and to fill a space between the layers to be plated 13A, 13B, and 13C.

In the example of FIG. 11, the peripheral wiring 13 includes four layers to be plated 13A, 13B, 13C, and 13D in the width direction thereof. Each of the layers to be plated 13A, 13B, 13C, and 13D connects the first electrode pad 12 and the second electrode pad 14. The metal plating layer 4 is formed to cover the four layers to be plated 13A, 13B, 13C, and 13D and to fill a space between the layers to be plated 13A, 13B, 13C, and 13D.

As described above, as the peripheral wiring 13 includes a plurality of layers to be plated 3 in the width direction thereof and the width A of the layer to be plated 3 is narrowed, a contact area between each of the layers to be plated 3 and metal plating layers 4 is reduced, and thus the stress of the metal plating layer 4 is reduced. Therefore, adhesiveness between each of the layers to be plated 3 and the metal plating layers 4 is improved.

In addition, an example in which each of the plurality of layers to be plated 3 in the peripheral wiring 13 has the same width A is described. However, widths A of the plurality of layers to be plated 3 may be different from each other. In this case, it is preferable that the maximum width A among the widths of the plurality of layers to be plated 3 in the peripheral wiring 13 satisfies a relationship of W1/A>2 with respect to the line width W1 of the peripheral wiring 13.

Figure 12:
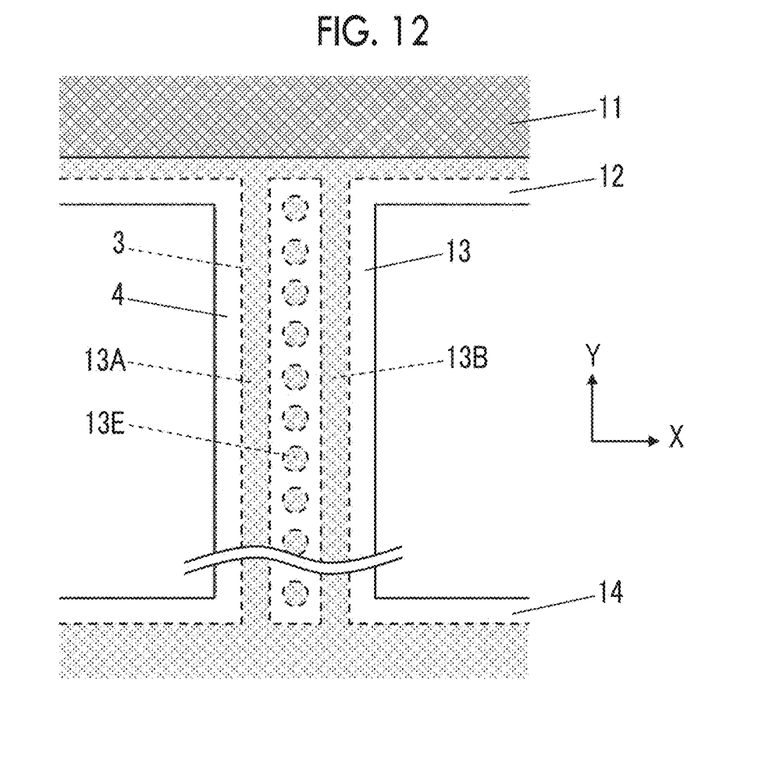
FIG. 12 is an enlarged plan view showing a peripheral wiring according to a third modification example of the embodiment.

In addition, for example, as shown in FIG. 12, the peripheral wiring 13 can also include an island-like layer to be plated 13E isolated from the surrounding layers to be plated 13A and 13B. In this example, the metal plating layer 4 is formed to cover the layer to be plated 13A and 13B, and a plurality of island-like layers to be plated 13E, and to fill a space between the layers to be plated 13A and 13B, and the plurality of island-like layers to be plated 13E. By sufficiently reducing an area of the island-like layer to be plated 13E in a plan view, that is, as viewed from the Z direction, stress of a portion of the metal plating layer 4 in contact with the layer to be plated 13E can be sufficiently reduced, so that adhesiveness between the layer to be plated 13E and the metal plating layer 4 can be improved.

Figure 13:
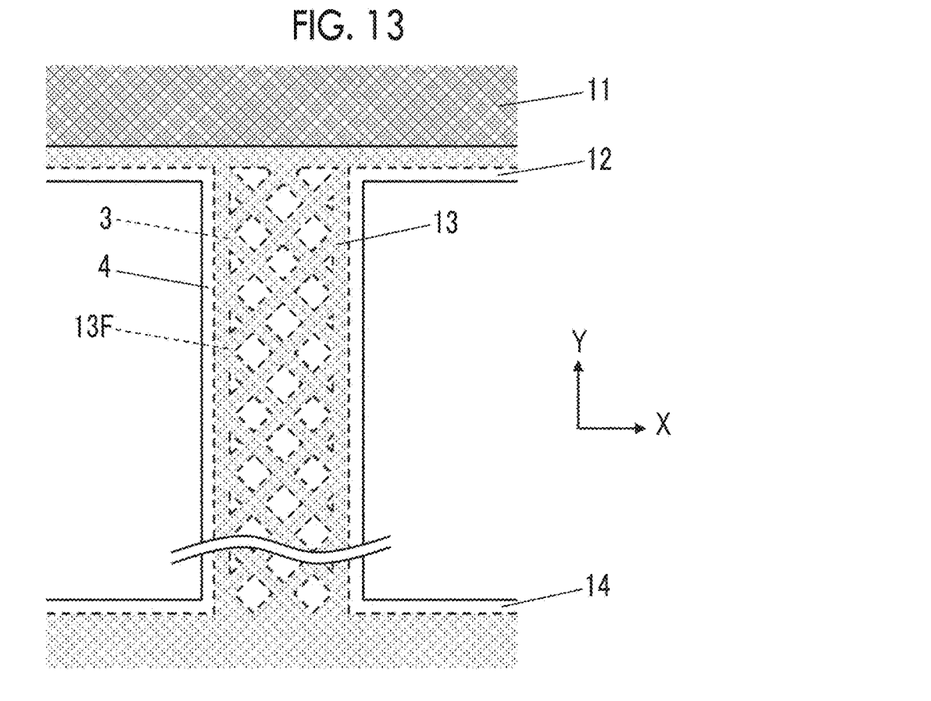
FIG. 13 is an enlarged plan view showing a peripheral wiring according to a fourth modification example of the embodiment.

In addition, for example, as shown in FIG. 13, the peripheral wiring 13 can also include a plurality of linear layers to be plated 13F forming a mesh shape. In this example, the metal plating layer 4 is formed to cover the plurality of layers to be plated 13F and to fill a space between the plurality of layers to be plated 13F. In this case, since the width A of the plurality of layers to be plated 13F forming the mesh shape can be sufficiently narrowed as compared with the line width W1 of the peripheral wiring 13, stress of the metal plating layer 4 in contact with the layer to be plated 13F can be sufficiently reduced, so that adhesiveness between the layer to be plated 13F and the metal plating layer 4 can be improved.

Figure 14:
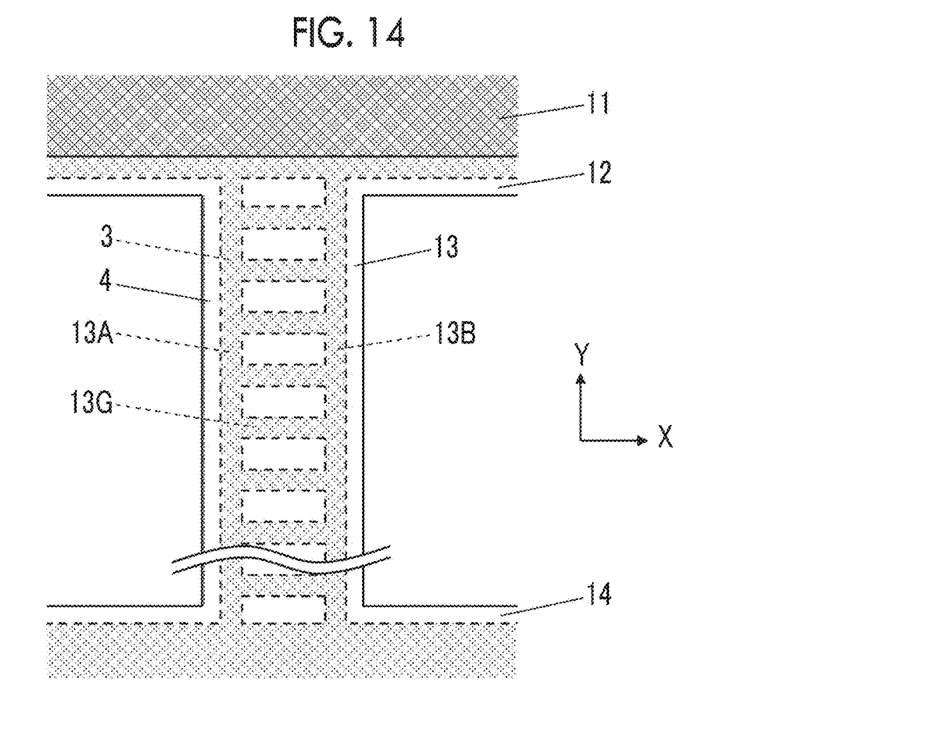
FIG. 14 is an enlarged plan view showing a peripheral wiring according to a fifth modification example of the embodiment.

In addition, for example, as shown in FIG. 14, the peripheral wiring 13 can include the two layers to be plated 13A and 13B extending along the direction in which the peripheral wiring 13 extends and a plurality of layers to be plated 13G extending along the width direction of the peripheral wiring 13 and connecting the layers to be plated 13A and 13B. A so-called ladder-like shape is formed by the layers to be plated 13A and 13B, and the plurality of layers to be plated 13G. In this example, the metal plating layer 4 is formed to cover the layers to be plated 13A and 13B, and the plurality of layers to be plated 13G and to fill a space between the layers to be plated 13A and 13B, and the plurality of layers to be plated 13G. In this case, by sufficiently reducing the width A of the plurality of layers to be plated 13G, stress of the metal plating layer 4 in contact with each of the plurality of layers to be plated 13G can be sufficiently reduced, so that adhesiveness between each of the plurality of layers to be plated 13G and the metal plating layer 4 can be improved.

In the example of FIG. 14, the peripheral wiring 13 includes the two layers to be plated 13A and 13B extending along the direction in which the peripheral wiring 13 extends. However, the peripheral wiring 13 can also include the three or more layers to be plated 3 extending along the direction in which the peripheral wiring 13 extends.

Figure 15:
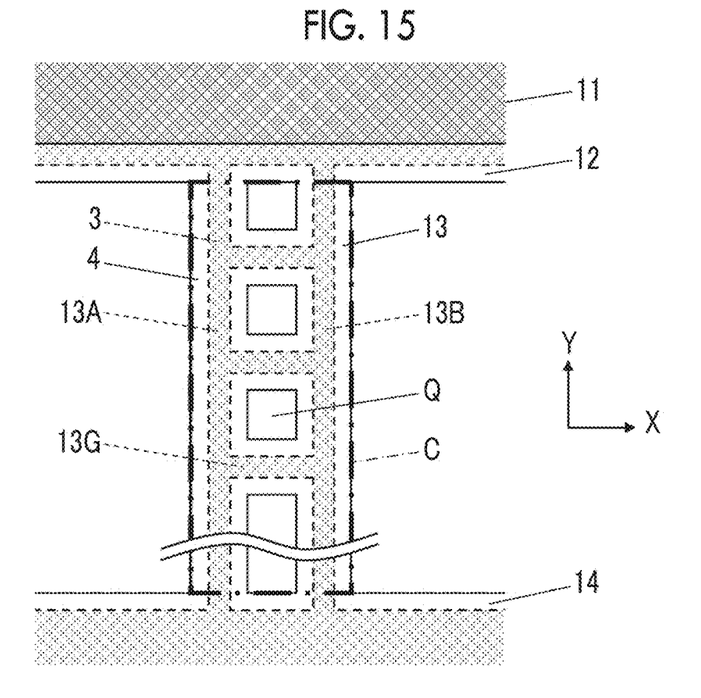
FIG. 15 is an enlarged plan view showing a peripheral wiring according to a sixth modification example of the embodiment.

In addition, by sufficiently widening an interval between the plurality of layers to be plated 13G and not bonding the metal plating layers 4 that precipitate on the plurality of layers to be plated 13G each other, as shown in FIG. 15, a plurality of opening portions Q located between the plurality of layers to be plated 13G can be formed in the metal plating layer 4. Even in this case, in the same manner as that in the example shown in FIG. 14, by sufficiently reducing the width A of the plurality of layers to be plated 13G, the stress of the metal plating layer 4 in contact with each of the plurality of layers to be plated 13G can be sufficiently reduced, so that the adhesiveness between each of the plurality of layers to be plated 13G and the metal plating layer 4 can be improved.

In order to secure sufficient conductivity of the peripheral wiring 13 and to secure sufficient adhesiveness of the metal plating layer 4 with respect to layers to be plated 13A, 13B, and 13G, it is preferable that a ratio SM/ST of an area SM occupied by the metal plating layer 4 of the peripheral wiring 13 in the plan view, to an area ST of a portion surrounded by a contour C of the peripheral wiring 13 in the plan view satisfies SM/ST≥0.9. Here, the area SM occupied by the metal plating layer 4 of the peripheral wiring 13 in plan the view is the same as an area obtained by subtracting areas of the plurality of opening portions Q from the area ST of the portion surrounded by the contour C in the plan view.

Hereinafter, a method for manufacturing the touch sensor of the embodiment will be described.

Figure 7:
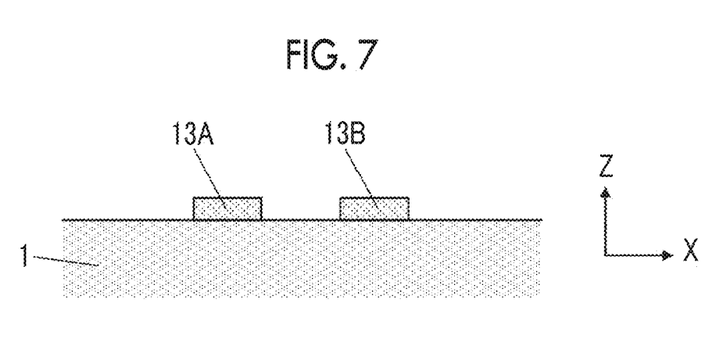
FIG. 7 is a cross-sectional view of a layer to be plated of a peripheral wiring before a plating step.

First, the transparent substrate 1 is prepared, and the layer to be plated 3 corresponding to the plurality of touch detection electrodes 11, the plurality of first electrode pads 12, the plurality of peripheral wirings 13, and the plurality of second electrode pads 14 is formed on the first surface 1A of the substrate 1 by using, for example, a photolithography method. As shown in FIGS. 5 and 7, the layer to be plated 3 corresponding to each of the plurality of peripheral wirings 13 includes, for example, the two layers to be plated 13A and 13B adjacent to each other in the width direction of the peripheral wiring 13.

In addition, the layer to be plated 3 corresponding to the plurality of touch detection electrodes 21, the plurality of first electrode pads 22, the plurality of peripheral wirings 23, and the plurality of second electrode pads 24 is formed on the second surface 1B of the substrate 1 by the same method as the method of forming the layer to be plated 3 on the first surface 1A of the substrate 1. The layer to be plated 3 corresponding to each of the plurality of peripheral wirings 23 includes, for example, two layers to be plated 3 adjacent to each other in a width direction of the peripheral wiring 23.

Figure 8:
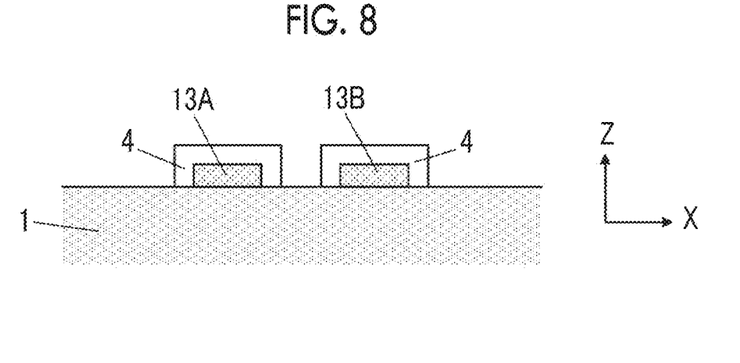
FIG. 8 is a cross-sectional view of a layer to be plated and a metal plating layer of a peripheral wiring in the middle of the plating step.
Figure 9:
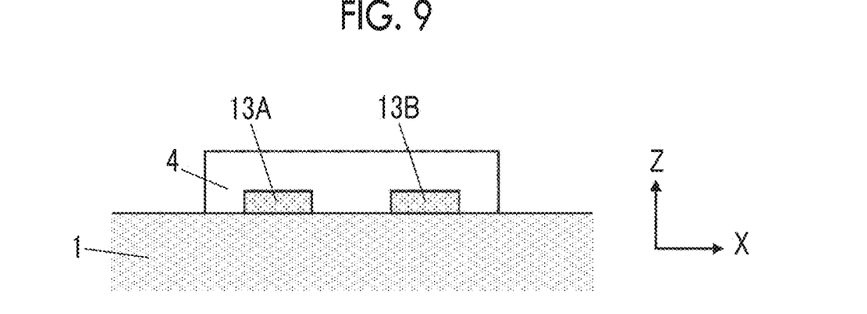
FIG. 9 is a cross-sectional view of the peripheral wiring according to the embodiment.

Next, in a state where the substrate 1, in which the layers to be plated 3 are formed on each of the first surface 1A and the second surface 1B, is immersed in a plating liquid, the layers to be plated 3 are subjected to a plating treatment. As a result, the metal is precipitated on the layer to be plated 3, and the metal plating layer 4 is formed. In this case, for example, as shown in FIG. 8, metal is precipitated in each of the two layers to be plated 13A and 13B in the peripheral wiring 13, and the metal plating layer 4 is formed. The metal plating layers 4 precipitated on the layer to be plated 13A and 13B is gradually increased in thickness in a plating step, and thus the metal plating layers 4 gradually shortens a distance between them each other. The plating treatment can be performed independently on the layers to be plated 13A and 13B until the plating treatment further proceeds and the metal plating layers 4 precipitated on the layers to be plated 13A and 13B come into contact with each other. Finally, as shown in FIG. 9, in a case where the metal plating layer 4 and both of the layers to be plated 13A and 13B are bonded to each other to cover both of them, the touch sensor as shown in FIG. 2 is completed.

Hereinafter, each of the members constituting the touch sensor according to embodiment will be described.

Substrate 1

The kind of the substrate 1 is not particularly limited as long as it is a member that can support the first conductive layer 2A and the second conductive layer 2B. Examples of the substrate 1 include a plastic substrate, a glass substrate, and a metal substrate, among which the plastic substrate is preferable.

As the substrate 1, a substrate having flexibility is preferable from the viewpoint of excellent bendability. Examples of the substrate having flexibility include the plastic substrate. The thickness of the substrate 1 is not particularly limited and is likely to be 25 µm to 500 µm.

As a material constituting the substrate 1, a resin having a melting point of about 290° C. or lower such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable. Among these, PET is preferable from the viewpoint of excellent adhesiveness between the first conductive layer 2A and the second conductive layer 2B. The numerical value in the above described ( ) is the melting point or the glass transition temperature.

The total light transmittance of the substrate 1 is preferably 85% to 100%. The total light transmittance is measured by using "Plastics-Determination of Total Luminous Transmittance and Reflectance" defined by Japanese Industrial Standards (JIS) K 7375:2008.

Examples of a suitable aspect of the substrate 1 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the substrate 1 such that the adhesiveness between the substrate 1 and the first conductive layer 2A and the adhesiveness between the substrate 1 and the second conductive layer 2B are improved. In addition, the atmospheric pressure plasma treatment is preferable among the above-described treatments from the viewpoint of further improving the adhesiveness between the substrate 1 and the first conductive layer 2A and the adhesiveness between the substrate 1 and the second conductive layer 2B.

Undercoat Layer

In order to improve the adhesiveness between the substrate 1 and the first conductive layer 2A and the adhesiveness between the substrate 1 and the second conductive layer 2B, an undercoat layer can also be disposed between the substrate 1 and the first conductive layer 2A and between the substrate 1 and the second conductive layer 2B, respectively. This undercoat layer includes a polymer such that the adhesiveness between the substrate 1 and the first conductive layer 2A and the adhesiveness between the substrate 1 and the second conductive layer 2B are further improved.

A method for forming the undercoat layer is not particularly limited, and examples thereof include a method of applying a composition for forming an undercoat layer including a polymer to the substrate and optionally performing a heat treatment thereon. In addition, for example, gelatin, an acrylic resin, a urethane resin, or an acrylic styrene latex including fine particles of an inorganic material or a polymer may be used as a composition for forming the undercoat layer, including a polymer.

Furthermore, the touch sensor may comprise a refractive index adjusting layer, as a layer other than the above-described undercoat layer, between the substrate 1 and the first conductive layer 2A and between the substrate 1 and the second conductive layer 2B, respectively. For example, an organic layer to which particles of a metal oxide such as zirconium oxide that adjusts a refractive index has been added can be used as the refractive index adjusting layer, as necessary.

First Conductive Layer and Second Conductive Layer

The first conductive layer 2A and the second conductive layer 2B have a metal or an alloy as a material forming the layer, and can be formed of, for example, silver, copper, gold, aluminum, nickel, chromium, molybdenum, or tungsten. The first conductive layer 2A and the second conductive layer 2B preferably include copper, but may include a metal other than copper, for example, gold or silver. In addition, the first conductive layer 2A and the second conductive layer 2B may have a laminated structure of a metal and a metal compound, and a fine metal wire having a laminated structure such as copper/copper oxide or copper/copper sulfide can be used.

Next, a method for forming the first conductive layer 2A and the second conductive layer 2B will be described. As the method for forming those layers, a plating method can be used as appropriate.

A method for forming the first conductive layer 2A and the second conductive layer 2B using a plating method will be described. Examples thereof include a method, in which the layer to be plated 3 in which a photosensitive polymer containing plating catalytic metal particles has been patterned by a photolithography method is subjected to a plating treatment, and a method in which a photosensitive polymer having a functional group such as a carboxyl group is patterned by a photolithography method and then the layer to be plated 3 having a catalytic metal supported on a functional group is subjected to a plating treatment by performing a treatment with a solution including catalytic metal ions.

EXAMPLES

Example 1

The present invention will be described in more detail based on the following examples. Materials, used amounts, ratios, treatment details, and treatment procedures shown in the following examples can be modified as appropriate within a range not departing from the scope of the present invention. Thus, the scope of the present invention is not limited to the following examples.

Preparation of Composition for Forming Layer to Be Plated

The following respective components were mixed to obtain a composition for forming a layer to be plated.

Isopropanol 38 Parts by Mass

Polybutadiene maleic acid (butadiene-maleic acid alternating copolymer, repeating units derived from butadiene: repeating units derived from maleic acid=1:1 (molar ratio), manufactured by Polysciences, Inc.) 4 parts by mass     FAM-201 (bifunctional acrylamide, manufactured by FUJIFILM Wako Pure Chemical Corporation) 1 part by mass     IRGACURE-OXE02 (Oxime ester-based polymerization initiator, manufactured by BASF) 0.05 parts by mass Manufacture of Substrate with Precursor Layer of Layer to be Plated As a substrate, a polyester film (COSMOSHINE (registered trademark) A4360, manufactured by TOYOBO Co., Ltd.) with easy-adhesive layers on both sides, having a thickness of 50 µm, was prepared. The composition for forming a layer to be plated was applied with a bar on one surface of the substrate such that the thickness was about 0.3 µm. After the application of the composition, the composition was dried at a temperature of 120° C. for 1 minute to obtain a substrate with a precursor layer of a layer to be plated. Then, a protective film made of polypropylene having a thickness of 12 µm was bonded to the surface of the precursor layer of a layer to be plated.

Manufacture of Substrate with Layer to be Plated

An exposure mask having exposure patterns corresponding to the plurality of touch detection electrodes 11, the plurality of first electrode pads 12, the plurality of peripheral wirings 13, and the plurality of second electrode pads 14 was disposed on the substrate with the precursor of the layer to be plated, to which the protective film had been bonded, as shown in FIG. 2. Here, as shown in FIG. 5, each of the exposure patterns corresponding to the plurality of peripheral wirings 13 is composed of two linear patterns that are parallel to each other and connect the exposure pattern corresponding to one first electrode pad 12 and the exposure pattern corresponding to one second electrode pad 14.

In the exposure pattern corresponding to the touch detection electrode 11, the line width of the pattern corresponding to the plurality of fine metal wires M was set to 1.3 µm. In addition, the exposure pattern corresponding to the touch detection electrode 11 had a square mesh-like opening pattern (pitch of 300.0 µm). In addition, the exposure pattern corresponding to the touch detection electrode 11 was set in a rectangular shape having a width of 2.0 mm and a length of 100.0 mm. The exposure pattern corresponding to the first electrode pad 12 was set in a rectangular shape having a width of 5.0 µm and a length of 2.0 mm. Each of line widths of two exposure patterns corresponding to the peripheral wiring 13 was set to 7.0 µm, and lengths thereof were set to 50.0 mm. In addition, a width of the exposure pattern corresponding to the second electrode pad 14 was set to 50.0 µm, and a length thereof was set to 500.0 µm. Furthermore, in a case where the exposure pattern corresponding to the conductive pattern part E1 composed of the touch detection electrode 11, the first electrode pad 12, the peripheral wiring 13, and the second electrode pad 14 was disposed such that fifty exposure patterns corresponding to the touch detection electrode 11 were arranged at intervals of 50.0 µm.

Next, the substrate with a precursor layer of a layer to be plated was irradiated with UV light at 30 mJ/cm$^2$ using a high-pressure mercury lamp through an exposure mask. After the irradiation with UV light, the protective film was peeled off from the substrate with the precursor layer of a layer to be plated. The substrate with the precursor layer of a layer to be plated, from which the protective film had been peeled off, was shower-washed with a 1% by mass aqueous sodium carbonate solution and subjected to an alkali development treatment to obtain a substrate with a mesh-like layer to be plated. As shown in FIG. 5, the formed layer to be plated had a portion corresponding to the touch detection electrode 11, a portion corresponding to the first electrode pad 12, the two layers to be plated 13A and 13B corresponding to the peripheral wiring 13, and a portion corresponding to the second electrode pad 14.

Here, the widths A of the layers to be plated 13A and 13B corresponding to the peripheral wiring 13 were 7.0 µm. Here, any ten points in each of the layers to be plated 13A and 13B corresponding to the plurality of peripheral wirings 13 were selected, and a width of the layers to be plated 13A and 13B seen in an image captured by using a scanning electron microscope at each of the selected points was measured, thereby obtaining a width of each of the ten points of the layers to be plated 13A and 13B. Further, in each of the layers to be plated 13A and 13B, an average value of widths at ten points was calculated. As the width of the layer to be plated 13A and 13B, the larger one out of an average value of a line width of the layer to be plated 13A and an average value of the width of the layer to be plated 13B was selected.

Manufacture of Substrate (Touch Sensor) with Copper Plating Layer

A Pd catalyst-imparting liquid Omnishield 1573 activator (manufactured by Rohm and Haas Electronic Materials LLC) was diluted with pure water to 3.6% by volume, and the substrate with the layer to be plated was immersed in an aqueous solution with a pH (hydrogen ion exponent) adjusted to 4 with 0.1 N hydrochloric acid at a temperature of 45° C. for 5 minutes. Thereafter, the substrate with the layer to be plated was washed twice with pure water.

Next, the substrate with the layer to be plated was immersed in a 0.8% by volume aqueous solution of a reducing agent CIRCUPOSIT PB Oxide Converter 60C (manufactured by Rohm and Haas Electronic Materials LLC) at a temperature of 30° C. for 5 minutes. Thereafter, the substrate with the layer to be plated was washed twice with pure water and subjected to a Pd catalyst treatment. Next, the substrate with the layer to be plated which had been subjected to the Pd catalyst treatment was immersed in an electroless plating liquid obtained by mixing 12% by volume of an M agent, 6% by volume of an A agent, and 10% by volume of a B agent of CIRCUPOSIT 4500 (manufactured by Rohm and Haas Electronic Materials LLC) at a temperature of 45° C. for 35 minutes. Thereafter, the substrate with the layer to be plated was washed with pure water to form a copper plating layer covering the layer to be plated as a metal plating layer, thereby obtaining a substrate (touch sensor) with the copper plating layer. The touch sensor thus obtained had the first conductive layer 2A including the plurality of touch detection electrodes 11; the plurality of first electrode pads 12; the plurality of peripheral wirings 13; and the plurality of second electrode pads 14, for example, as shown in FIG. 2.

The line width W2 of the fine metal wire M of the touch detection electrode 11 in the obtained touch sensor was 2.0 µm. Here, when the line width W2 of the fine metal wire M is calculated, first, any ten points in the touch detection electrode 11 were selected, and the line width W1 of the fine metal wire M seen in the image captured by using a scanning electron microscope at each of the selected points was measured, thereby obtaining the line width W2 of the fine metal wire M at ten points on the fine metal wire M. Further, an average value of line widths W2 of the fine metal wire M at ten points on the fine metal wire M was calculated, and this was adopted as the line width W2 of the fine metal wire M. Here, the line width W2 in a cross section of the fine metal wire M at each of the points was used for calculation of a maximum value.

A ratio W1/A of the line width W1 of the peripheral wiring 13 to the widths A of the layers to be plated 13A and 13B of the peripheral wiring 13 was 2.6.

Example 2

A touch sensor according to Example 2 was manufactured by using the same method as that of Example 1, except that, in a step of manufacturing the substrate with a layer to be plated, an exposure mask having three linear patterns parallel to each other as shown in FIG. 10 was used as an exposure pattern corresponding to the plurality of peripheral wirings 13. The widths A of the layers to be plated 13A, 13B, and 13C of the peripheral wiring 13 were 4.0 µm, the line width W1 of the peripheral wiring 13 was 18.0 µm, and the line width W2 of the fine metal wire M of the touch detection electrode 11 was 2.0 µm. Therefore, a ratio W1/A of the line width W1 of the peripheral wiring 13 to the widths A of the layers to be plated 13A, 13B, and 13C of the peripheral wiring 13 was 4.5.

Example 3

A touch sensor according to Example 3 was manufactured by using the same method as that of Example 2, except that, in the three linear patterns of the exposure mask used in Example 2, the central linear pattern was made thinner than the linear patterns at both ends to shorten the distance between the linear patterns at both ends. The widths A of the layers to be plated 13A, 13B, and 13C of the peripheral wirings 13 were 4.0 µm, the line width W1 of the peripheral wiring 13 was 17.0 µm, and the line width W2 of the fine metal wire M of the touch detection electrode 11 was 2.0 µm. Therefore, a ratio W1/A of the line width W1 of the peripheral wiring 13 to the widths A of the layers to be plated 13A, 13B, and 13C of the peripheral wiring 13 was 4.3.

Example 4

A touch sensor according to Example 4 was manufactured by using the same method as that of Example 1, except that, in a step of manufacturing the substrate with a layer to be plated, an exposure mask having a ladder-like pattern as shown in FIG. 15 was used as an exposure pattern corresponding to the plurality of peripheral wirings 13. The metal plating layer 4 in the peripheral wiring 13 of the manufactured touch sensor had the plurality of opening portions Q. The widths A of the layers to be plated 13A, 13B, and 13G of the peripheral wirings 13 were 4.0 µm, the line width W1 of the peripheral wiring 13 was 18.0 µm, and the line width W2 of the fine metal wire M of the touch detection electrode 11 was 2.0 µm. Therefore, a ratio W1/A of the line width W1 of the peripheral wiring 13 to the widths A of the layers to be plated 13A, 13B, and 13G of the peripheral wiring 13 was 4.5.

In addition, the ratio SM/ST of the area SM of the metal plating layer 4 of the peripheral wiring 13 in the plan view to the area ST of the portion surrounded by the contour C of the peripheral wiring 13 in the plan view was 0.8. Here, any ten peripheral wirings 13 were selected, and an image was captured by using a scanning electron microscope from a viewpoint in which each of the ten peripheral wirings 13 is viewed from the Z direction. Further, in each of the images of the ten peripheral wirings 13, the area ST of the portion surrounded by the contour C of the peripheral wiring 13 and the area SM of the metal plating layer 4 of the peripheral wiring 13 were calculated, so that the ratio SM/ST was calculated. Finally, ten values of the ratio SM/ST were averaged to obtain a final value of the ratio SM/ST.

Example 5

A touch sensor according to Example 5 was manufactured by using the same method as that of Example 1, except that, in a step of manufacturing the substrate with a layer to be plated, an exposure mask having four linear patterns parallel to each other as shown in FIG. 11 was used as an exposure pattern corresponding to the plurality of peripheral wirings 13. The widths A of the layers to be plated 13A, 13B, 13C, and 13D of the peripheral wiring 13 were 2.0 µm, the line width W1 of the peripheral wiring 13 was 17.0 µm, and the line width W2 of the fine metal wire M of the touch detection electrode 11 was 2.0 µm. Therefore, a ratio W1/A of the line width W1 of the peripheral wiring 13 to the widths A of the layers to be plated 13A, 13B, 13C, and 13D of the peripheral wiring 13 was 8.5.

Comparative Example 1

A touch sensor according to Comparative Example 1 was manufactured by using the same method as that of Example 1, except that, in a step of manufacturing the substrate with a layer to be plated, an exposure mask having one linear pattern as shown in FIG. 6 was used as an exposure pattern corresponding to the plurality of peripheral wirings 13. The width A of the layer to be plated 3 of the peripheral wiring 13 was 16.0 µm, the line width W1 of the peripheral wiring 13 was 18.0 µm, and the line width W2 of the fine metal wire M of the touch detection electrode 11 was 2.0 µm. Therefore, a ratio W1/A of the peripheral wiring 13 to the width A of the layer to be plated 3 of the peripheral wiring 13 was 1.1.

Comparative Example 2

Figure 16:
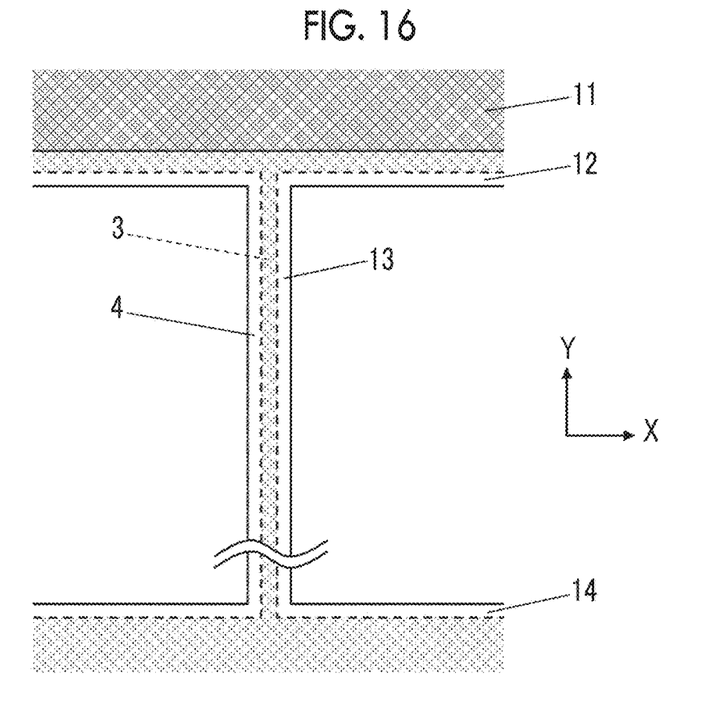
FIG. 16 is an enlarged plan view showing a peripheral wiring according to a comparative example.

A touch sensor according to Comparative Example 2 was manufactured by using the same method as that of Comparative Example 1, except that the width A of one linear pattern in the exposure mask used in Comparative Example 1 was made thinner as shown in FIG. 16. The width A of the layer to be plated 3 of the peripheral wiring 13 was 2.0 µm, the line width W1 of the peripheral wiring 13 was 4.0 µm, and the line width W2 of the fine metal wire M of the touch detection electrode 11 was 2.0 µm. Therefore, a ratio W1/A of the peripheral wiring 13 to the width A of the layer to be plated 3 of the peripheral wiring 13 was 2.0.

With regard to the touch sensors of Examples 1 to 5 and Comparative Examples 1 and 2 manufactured in this way, conductivity evaluation, adhesiveness evaluation, and scratch resistance evaluation shown below were performed.

Conductivity Evaluation

Among the plurality of peripheral wirings 13, a wire resistance value of the peripheral wiring 13 randomly selected was measured. In this case, four microprobes (tungsten probes manufactured by Micro Support Co., Ltd., diameter: 0.5 µm) were brought into contact with each of four different locations along the extension direction of the selected peripheral wiring 13. Next, a constant current was caused to flow through two microprobes located on both ends of the outer side using a source meter (2400 general-purpose source meter, manufactured by Keithley) such that a voltage between two microprobes located on the inner side was 5 mV, and a resistance value between the two microprobes located on the inner side was measured. Further, the wire resistance value of the peripheral wiring 13 was calculated by dividing the measured resistance value by a distance between the two microprobes located on the inner side.

The calculated wire resistance value of the peripheral wiring 13 was evaluated based on the following evaluation standard. A represents that the conductivity is excellent, B represents that there is no practical problem in the conductivity, and C represents that there is a problem in the conductivity.

A: The wire resistance value is less than 80 Ω/mm.
B: The wire resistance value is 80 Ω/mm or more and less than 100 Ω/mm.

C: The wire resistance value is 100 Ω/mm or more.

Adhesiveness Evaluation

The wire resistance value of the peripheral wiring 13 was measured by using the same method as the method of measuring the wire resistance value of the peripheral wiring 13 in the conductivity evaluation. Next, a pressure sensitive adhesive tape "610" manufactured by 3M Company was attached to the entire plurality of peripheral wirings 13, and then the pressure sensitive adhesive tape was peeled off from the plurality of peripheral wirings 13. Subsequently, the wire resistance value of the peripheral wiring 13 after the pressure sensitive adhesive tape was peeled off was measured by using the same method as the method of measuring the wire resistance value of the peripheral wiring 13 before the pressure sensitive adhesive tape was attached to the plurality of peripheral wirings 13.

Finally, the resistance increase rate of the peripheral wiring 13 was calculated by calculating (the wire resistance value of the peripheral wiring 13 after the pressure sensitive adhesive tape was peeled off)/(the wire resistance value of the peripheral wiring 13 before the pressure sensitive adhesive tape was attached)×100%. The calculated resistance increase rate was evaluated based on the following evaluation standard. Evaluation A represents that the adhesiveness of the metal plating layer 4 of the peripheral wiring 13 to the layer to be plated 3 is excellent, evaluation B represents that there is no practical problem in the adhesiveness of the metal plating layer 4 of the peripheral wiring 13 to the layer to be plated 3, and evaluation C represents that the adhesiveness of the metal plating layer 4 of the peripheral wiring 13 to the layer to be plated 3 is poor and there is a practical problem.

A: The resistance increase rate is less than 5%.

B: The resistance increase rate is 5% or more and less than 10%.

C: The resistance increase rate is 10% or more.

Scratch Resistance Evaluation

The wire resistance value of the peripheral wiring 13 was measured by using the same method as the method of measuring the wire resistance value of the peripheral wiring 13 in the conductivity evaluation. Next, the touch sensor was disposed on a flat table, and dust-free paper (RN72 light blue, manufactured by Oji F-Tex Co., Ltd.) was disposed on the plurality of peripheral wirings 13. Next, a weight was placed on the dust-free paper to apply a vertical load of 100 g/cm² to the plurality of peripheral wirings 13 through the dust-free paper. Subsequently, surfaces of the plurality of peripheral wirings 13 were rubbed by allowing the dust-free paper and the weight to travel back and forth together five times at a speed of 5 cm/sec along the horizontal direction at a predetermined distance to pass through the plurality of peripheral wirings 13.

Subsequently, the wire resistance value of the peripheral wiring 13 rubbed with the loaded dust-free paper was measured by using the same method as the method of measuring the wire resistance value of the peripheral wiring 13 before rubbing the plurality of peripheral wirings 13. Finally, the resistance increase rate of the peripheral wiring 13 was calculated by calculating (the wire resistance value of the peripheral wiring 13 after the rub test)/(the wire resistance value of the peripheral wiring 13 before the rub test)×100%. The calculated resistance increase rate was evaluated based on the following evaluation standard. Evaluation A represents that the adhesiveness of the metal plating layer 4 of the peripheral wiring 13 to the layer to be plated 3 is excellent, evaluation B represents that there is no practical problem in the adhesiveness of the metal plating layer 4 of the peripheral wiring 13 to the layer to be plated 3, and evaluation C represents that the adhesiveness of the metal plating layer 4 of the peripheral wiring 13 to the layer to be plated 3 is poor and there is a practical problem.

A: The resistance increase rate is less than 5%.

B: The resistance increase rate is 5% or more and less than 10%.

C: The resistance increase rate is 10% or more.

Table 1 shows the evaluation results for Examples 1 to 5 and Comparative Examples 1 and 2.

TABLE 1

| | The number of layers to be plated with respect to one peripheral wiring | Width A of layer to be plated | Line width W1 of peripheral wiring | Ratio W1/A | Area ratio SM/ST | Conductivity evaluation | Adhesiveness evaluation | Scratch resistance evaluation |
|---|---|---|---|---|---|---|---|---|
| Example 1 | 2 | 7.0 µm | 18.0 µm | 2.6 | 1.0 | A | A | A |
| Example 2 | 3 | 4.0 µm | 18.0 µm | 4.5 | 1.0 | A | A | A |
| Example 3 | 3 | 4.0 µm | 17.0 µm | 4.3 | 1.0 | A | A | A |
| Example 4 | 2 | 4.0 µm | 18.0 µm | 4.5 | 0.8 | B | A | B |
| Example 5 | 4 | 2.0 µm | 17.0 µm | 8.5 | 1.0 | A | A | A |
| Comparative Example 1 | 1 | 16.0 µm | 18.0 µm | 1.1 | 1.0 | A | C | C |
| Comparative Example 2 | 1 | 2.0 µm | 4.0 µm | 2.0 | 1.0 | C | A | C |

As shown in Table 1, it can be seen that in the touch sensors of Examples 1 to 5, all of the conductivity evaluation, the adhesiveness evaluation, and the rub resistance evaluation are A or B, the peripheral wiring 13 has good conductivity, the adhesiveness of the peripheral wiring 13 of the metal plating layer 4 to the layer to be plated 3 is excellent, and the failure of the peripheral wiring 13 unlikely occurs. In the touch sensors of Examples 1 to 5, the stress of the metal plating layer 4 is dispersed to each of the layers to be plated 3 by providing two or more layers to be plated 3 adjacent to one peripheral wiring 13 in the width direction of the peripheral wiring 13. Therefore, it is considered that the metal plating layer 4 has excellent adhesiveness to the layer to be plated 3.

On the other hand, in the touch sensor of Comparative Example 1, the conductivity evaluation was A, but the adhesiveness evaluation and the rub resistance evaluation were C. Since the touch sensor of Comparative Example 1 has only one layer to be plated 3 on one peripheral wiring 13, the contact area between the layer to be plated 3 and the metal plating layer 4 in the peripheral wiring 13 is large, and the stress of the metal plating layer 4 is also large. Therefore, it is considered that in Comparative Example 1, as there is a practical problem in the adhesiveness of the metal plating layer 4 to the layer to be plated 3, the adhesiveness is lowered.

In addition, in the touch sensor of Comparative Example 2, the adhesiveness evaluation was A, but the conductivity evaluation and the rub resistance evaluation were C. In the touch sensor of Comparative Example 2, the line width W1 of the peripheral wiring 13 is 4.0 µm and is extremely thin, and thus the conductivity is considered to be low. In addition, in the touch sensor of Comparative Example 2, since the line width W1 of the peripheral wiring 13 is extremely thin, it is considered that the adhesiveness of the metal plating layer 4 to the layer to be plated 3 is excellent, while the touch sensor cannot withstand friction.

Here, in a case where the results of the conductivity evaluation and the rub resistance evaluation of Examples 1 to 5 are compared, any of the evaluations of Examples 1 to 3 and 5 is A, but any of the evaluations of Example 4 is B. This is because it is considered that the peripheral wiring 13 in Example 4 has the plurality of opening portions Q. However, in Example 4, since the ratio SM/ST of the area ST of the portion surrounded by the contour C of the peripheral wiring 13 to the area SM of the metal plating layer 4 of the peripheral wiring 13 is 0.8, and a proportion of the area occupied by the metal plating layer 4 is sufficiently large as compared with the opening portion Q, sufficient conductivity and rub resistance are obtained.

The present invention is basically configured as described above. Hereinabove, the touch sensor according to the embodiment of the present invention has been described in detail. However, the present invention is not limited to the above-described embodiments, and various improvements or modifications may be made within a range not departing from the scope of the present invention.

EXPLANATION OF REFERENCES

1: substrate
1A: first surface
1B: second surface
2A: first conductive layer
2B: second conductive layer
3, 13A, 13B, 13C, 13D, 13E, 13F, 13G: layer to be plated
4: metal plating layer
11, 21: touch detection electrode
12, 22: first electrode pad
13, 23: peripheral wiring
14, 24: second electrode pad
A: width
C: contour
M: fine metal wire
Q: opening portion
W1, W2: line width

What is claimed is:

1. A touch sensor comprising:
a substrate; and
a conductive layer formed on the substrate,
wherein the conductive layer has
a plurality of mesh-like touch detection electrodes formed of a plurality of fine metal wires,
a plurality of first electrode pads formed at at least one end of the plurality of touch detection electrodes,
a plurality of peripheral wirings drawn out from the plurality of first electrode pads, and
a plurality of second electrode pads electrically connected to the plurality of peripheral wirings,
the plurality of touch detection electrodes, the plurality of first electrode pads, the plurality of peripheral wirings, and the plurality of second electrode pads have a layer to be plated and a metal plating layer covering the layer to be plated,
each of the plurality of peripheral wirings includes two or more layers to be plated spaced from each other in a width direction of the peripheral wiring at at least one location, and
at least one of the two or more layers to be plated connects to both the layer to be plated of one of the plurality of first electrode pads and the layer to be plated of one of the plurality of second electrode pads.

2. The touch sensor according to claim 1, wherein each of the plurality of peripheral wirings includes two or more layers to be plated connecting the first electrode pad and the second electrode pad.

3. The touch sensor according to claim 1, wherein in a case where a line width of the plurality of peripheral wirings is denoted by W1 and a width of the layer to be plated in the plurality of peripheral wirings is denoted by A,
W1/A>2 is satisfied.

4. The touch sensor according to claim 2, wherein in a case where a line width of the plurality of peripheral wirings is denoted by W1 and a width of the layer to be plated in the plurality of peripheral wirings is denoted by A,
W1/A>2 is satisfied.

5. The touch sensor according to claim 1, wherein a line width W2 of the plurality of fine metal wires of the plurality of touch detection electrodes is 1.0 to 5.0 µm.

6. The touch sensor according to claim 2, wherein a line width W2 of the plurality of fine metal wires of the plurality of touch detection electrodes is 1.0 to 5.0 µm.

7. The touch sensor according to claim 3, wherein a line width W2 of the plurality of fine metal wires of the plurality of touch detection electrodes is 1.0 to 5.0 µm.

8. The touch sensor according to claim 1, wherein a ratio SM/ST of an area SM occupied by the metal plating layer of each of the plurality of peripheral wirings in a plan view, to an area ST of a portion surrounded by a contour of each of the plurality of peripheral wirings in the plan view satisfies SM/ST≥0.9.

9. The touch sensor according to claim 2, wherein a ratio SM/ST of an area SM occupied by the metal plating layer of each of the plurality of peripheral wirings in a plan view, to an area ST of a portion surrounded by a contour of each of the plurality of peripheral wirings in the plan view satisfies SM/ST≥0.9.

10. The touch sensor according to claim 3, wherein a ratio SM/ST of an area SM occupied by the metal plating layer of each of the plurality of peripheral wirings in a plan view, to an area ST of a portion surrounded by a contour of each of the plurality of peripheral wirings in the plan view satisfies SM/ST≥0.9.

11. The touch sensor according to claim 5, wherein a ratio SM/ST of an area SM occupied by the metal plating layer of each of the plurality of peripheral wirings in a plan view, to an area ST of a portion surrounded by a contour of each of the plurality of peripheral wirings in the plan view satisfies SM/ST≥0.9.

* * * * *